(12) United States Patent
Lv et al.

(10) Patent No.: US 10,670,011 B2
(45) Date of Patent: Jun. 2, 2020

(54) ELECTRONIC EXPANSION VALVE

(71) Applicant: Zhejiang Sanhua Climate and Appliance Controls Group Co., Ltd, Shaoxing, Zhejiang (CN)

(72) Inventors: Ming Lv, Zhejiang (CN); Weilong Chen, Shaoxing (CN)

(73) Assignee: Zhejiang Sanhua Climate and Appliance Controls Group Co., Ltd, Shaoxing, Zhejiang (CN)

( * ) Notice: Subject to any disclaimer, the term of this patent is extended or adjusted under 35 U.S.C. 154(b) by 184 days.

(21) Appl. No.: 15/750,165

(22) PCT Filed: Mar. 15, 2016

(86) PCT No.: PCT/CN2016/076350
§ 371 (c)(1),
(2) Date: Feb. 2, 2018

(87) PCT Pub. No.: WO2017/024795
PCT Pub. Date: Feb. 16, 2017

(65) Prior Publication Data
US 2018/0258927 A1 Sep. 13, 2018

(30) Foreign Application Priority Data
Aug. 11, 2015 (CN) .......................... 2015 1 0490496

(51) Int. Cl.
*F04B 49/22* (2006.01)
*F16K 1/36* (2006.01)
(Continued)

(52) U.S. Cl.
CPC ................ *F04B 49/22* (2013.01); *F16K 1/36* (2013.01); *F25B 41/04* (2013.01); *F25B 41/062* (2013.01); *F25B 2341/06* (2013.01)

(58) Field of Classification Search
CPC .......... F16K 31/04; F16K 1/10; F16K 31/047; F16K 31/508; F16K 31/50; F04B 49/22; F25B 41/04
See application file for complete search history.

(56) References Cited

U.S. PATENT DOCUMENTS 3,331,583 A * 7/1967 Backer .................. F16K 31/122
251/63.5
6,460,567 B1 * 10/2002 Hansen, III ............. F16K 31/04
137/554
(Continued)

FOREIGN PATENT DOCUMENTS

CN 202441956 U 9/2012
CN 202719158 U 2/2013
(Continued)

OTHER PUBLICATIONS

Machine Translation of CN104791502 from espacenet.com. (Year: 2019).*
(Continued)

*Primary Examiner* — Jessica Cahill
(74) *Attorney, Agent, or Firm* — Wolf, Greenfield & Sacks, P.C.

(57) ABSTRACT

An electronic expansion valve includes a valve seat component, including a valve seat and a valve core seat; and a valve rod component, capable of axially moving along a core cavity of the valve core seat to open or close a valve port. The valve rod component is provided with an axial through hole communicated with the valve port and a sealing surface capable of being adhered to and sealing the valve port. The valve rod component includes a valve rod and a valve core fixedly disposed at a lower end of the valve rod. The valve rod is a cylindrical body, including a small-diameter cylinder body and a large-diameter cylinder body close to the valve port. A first gap is provided between the
(Continued)

large-diameter cylinder body and the valve core seat, and a second gap is provided between the valve core and the valve port.

17 Claims, 7 Drawing Sheets

(51) Int. Cl.
*F25B 41/06* (2006.01)
*F25B 41/04* (2006.01)

(56) References Cited

U.S. PATENT DOCUMENTS

| | | | | |
|---|---|---|---|---|
| 6,568,656 | B1* | 5/2003 | Wrocklage | F16K 1/38 251/121 |
| 9,416,890 | B2* | 8/2016 | Nissen | F16K 31/04 |
| 10,352,467 | B2* | 7/2019 | Lv | F16K 31/508 |
| 2005/0034770 | A1* | 2/2005 | Stares | F16K 3/246 137/625.3 |
| 2006/0005890 | A1 | 1/2006 | Johnsen et al. | |
| 2013/0207014 | A1* | 8/2013 | Nissen | F16K 31/04 251/129.11 |
| 2014/0175315 | A1* | 6/2014 | Lv | F25B 41/062 251/282 |
| 2016/0195195 | A1* | 7/2016 | Lv | F16K 31/047 251/129.11 |

FOREIGN PATENT DOCUMENTS

| | | |
|---|---|---|
| CN | 203223617 U * | 10/2013 |
| CN | 203489549 U | 3/2014 |
| CN | 103867732 A | 6/2014 |
| CN | 103867789 A | 6/2014 |
| CN | 104613185 A | 5/2015 |
| CN | 104791497 A | 7/2015 |
| CN | 104791502 A | 7/2015 |
| CN | 204438622 U | 7/2015 |

OTHER PUBLICATIONS

Machine Translation of CN203223617U from espacenet.com (Year: 2019).*
International Search Report and Written Opinion for Application No. PCT/CN2016/076350 dated Jun. 21, 2016.
Summary of the 1$^{st}$ Chinese Office Action in connection with Application No. 201510490496 dated Jul. 13, 2018.

* cited by examiner

ELECTRONIC EXPANSION VALVE

This application is the National Phase of PCT Application No. PCT/CN2016/076350, filed on Mar. 15, 2016, which claims priority to Chinese Patent Application No. 201510490496.X, titled "ELECTRONIC EXPANSION VALVE", filed with the Chinese State Intellectual Property Office on Aug. 11, 2015, the entire disclosures of which are incorporated herein by reference.

FIELD

The present application relates to the technical field of fluid control components, and in particular to an electronic expansion valve.

BACKGROUND

An electronic expansion valve, as an important component for constituting a refrigeration system, is widely used in a large refrigeration unit, a large cold storage, a supermarket freezer and so on. A working process of the electronic expansion valve is generally as follows. An opening degree of a valve stem is adjusted with energizing or de-energizing of a motor, thus the flow rate of a refrigerant is adjusted.

A common electronic expansion valve includes a valve seat and a valve stem. Typically, the valve seat is provided with a valve port and two connection ports. The two connection ports may be communicated through the valve port. The valve stem has a sealing surface which is capable of fitting against an end surface, at the valve port, of the valve seat to seal the valve port. The valve stem is located in a valve cavity of the valve seat. Driven by the motor, the valve stem is axially movable along the valve cavity to open or close the valve port, so as to communicate or cut off the two connection ports.

Normally, a connection port in communication with the valve port may generate an axially upward acting force on the sealing surface of the valve stem. To avoid leakage at the valve port due to untight sealing, the valve stem may be provided with an axial through hole to allow an upper end and a lower end of the valve stem to be in the same pressure zone which generates an axially downward acting force on the upper end of the valve stem to balance forces received by the valve stem, thereby ensuring tightness. However, the upper end of the valve stem has a pressure receiving area greater than that of the lower end of the valve stem. As a result of the above, the valve stem is subjected to an axially downward acting force, which affects adversely valve opening capability of the electronic expansion valve.

In view of this, it is a technical issue to be addressed by the person skilled in the art to improve the structure of the electronic expansion valve, which ensures not only valve port tightness but also valve opening capability.

SUMMARY

An object of the present application is to provide an electronic expansion valve which can ensure both valve port tightness and a valve opening capability.

To address the above technical issue, it is provided according to the present application an electronic expansion valve which includes:

a valve seat component including a valve seat and a valve core seat inserted into the valve seat;

a valve stem component which is axially movable along a core cavity of the valve core seat to open or close a valve port for communicating or cutting off two connection ports of the electronic expansion valve;

the valve stem component has an axial through hole in communication with the valve port and a sealing surface which is capable of fitting against the valve port to seal the valve port; and specifically, the valve stem component includes a valve stem and a valve core fixed to a lower end of the valve stem, and the valve stem is a cylindrical body and includes a small-diameter segment cylinder and a large-diameter segment cylinder close to the valve port, and a first gap is provided between the large-diameter segment cylinder and the valve core seat, and a second gap is provided between the valve core and the valve port.

In the electronic expansion valve according to the present application, a first gap is provided between the large-diameter segment cylinder and the valve core seat, to form a first throttle passage. A second gap is provided between the valve core and the valve port, to form a second throttle passage. As such, when the valve port is opened with a small opening, due to throttling effects of the first throttle passage and the second throttle passage, a medium pressure zone having a pressure between a refrigerant inlet pressure and a refrigerant outlet pressure may be formed at the valve port. Formation of the medium pressure zone may equalize properly an air pressure to which the valve stem component is subjected, thereby improving the valve opening capability while ensuring the tightness.

Each of the sizes of the first gap and the size of the second gap is in a preset range, which allows a medium pressure zone having a pressure between a refrigerant inlet pressure and a refrigerant outlet pressure to be formed at the valve port between the first gap and the second gap at the start of valve opening.

The first gap has a size ranging from 0.1 mm to 0.5 mm.

The second gap has a size ranging from 0.1 mm to 0.8 mm.

The large-diameter segment cylinder has an axial dimension less than the axial dimension of the valve core.

The two connection ports and the valve port are all provided in the valve seat, and an inner cavity of the valve seat is divided into an upper cavity and a lower cavity by the valve port;

the valve core seat is inserted into the upper cavity and divides the upper cavity into a first upper cavity and a second upper cavity surrounding the first upper cavity, and a side wall of the valve core seat is provided with a flow opening via which the first upper cavity is in communication with the second upper cavity; and the second upper cavity and the lower cavity are in communication with the two connection ports respectively.

The flow opening has a circumferential dimension tapering downward in an axial direction of the valve core seat.

A lower portion of the flow opening is in a V-shape.

The valve stem component further includes a sealing ring, and the sealing ring is press-fitted between the valve stem and the valve core, and a lower end surface of the sealing ring forms the sealing surface.

One-to-one correspondences between names of components and reference numerals in FIGS. 1 to 12 are as follows:

| | |
|---|---|
| 10. | valve seat component, |
| 11. | valve seat, |
| 11a. | valve port, |
| 11b. | first upper cavity, |
| 11c. | second upper cavity, |
| 11d. | lower cavity, |
| 12. | valve core seat, |
| 12a. | flow opening, |
| 12b. | annular step surface, |
| 13. | first connection port pipe, |
| 14. | second connection port pipe; |
| 20. | valve stem component, |
| 20a. | axial through hole, |
| 20b. | sealing surface, |
| 21. | valve stem, |
| 211. | small-diameter segment cylinder, |
| 212a. | large-diameter segment cylinder, |
| 22. | valve core, |
| 23. | sealing ring, |
| 24. | snap, |
| 241. | boss; |
| 31. | position-limiting sleeve, |
| 32. | sealing washer, |
| 33. | retaining ring, |
| 34. | sliding-assist sheet; |
| 40. | gear system, |
| 41. | gear, |
| 42. | screw rod, |
| 43. | position-limiting lever; |
| 50. | motor. |

DETAILED DESCRIPTION OF EMBODIMENTS

An aspect of the present application is to provide an electronic expansion valve which can ensure the tightness of a valve port and the valve opening capability.

In order to make the person skilled in the art have a better understanding of solutions of the present application, the present application is described hereinafter in further detail in conjunction with the drawings and embodiments.

Locality terms such as upper and lower referred to herein are all defined based on positions where parts in FIGS. 1 to 12 are located in the figures and based on relative positions between the parts, which is just for the purpose of descriptive clarity and convenience of technical solutions. It is to be understood that the locality terms used herein should not limit the scope claimed by the present application.

Figure 1:
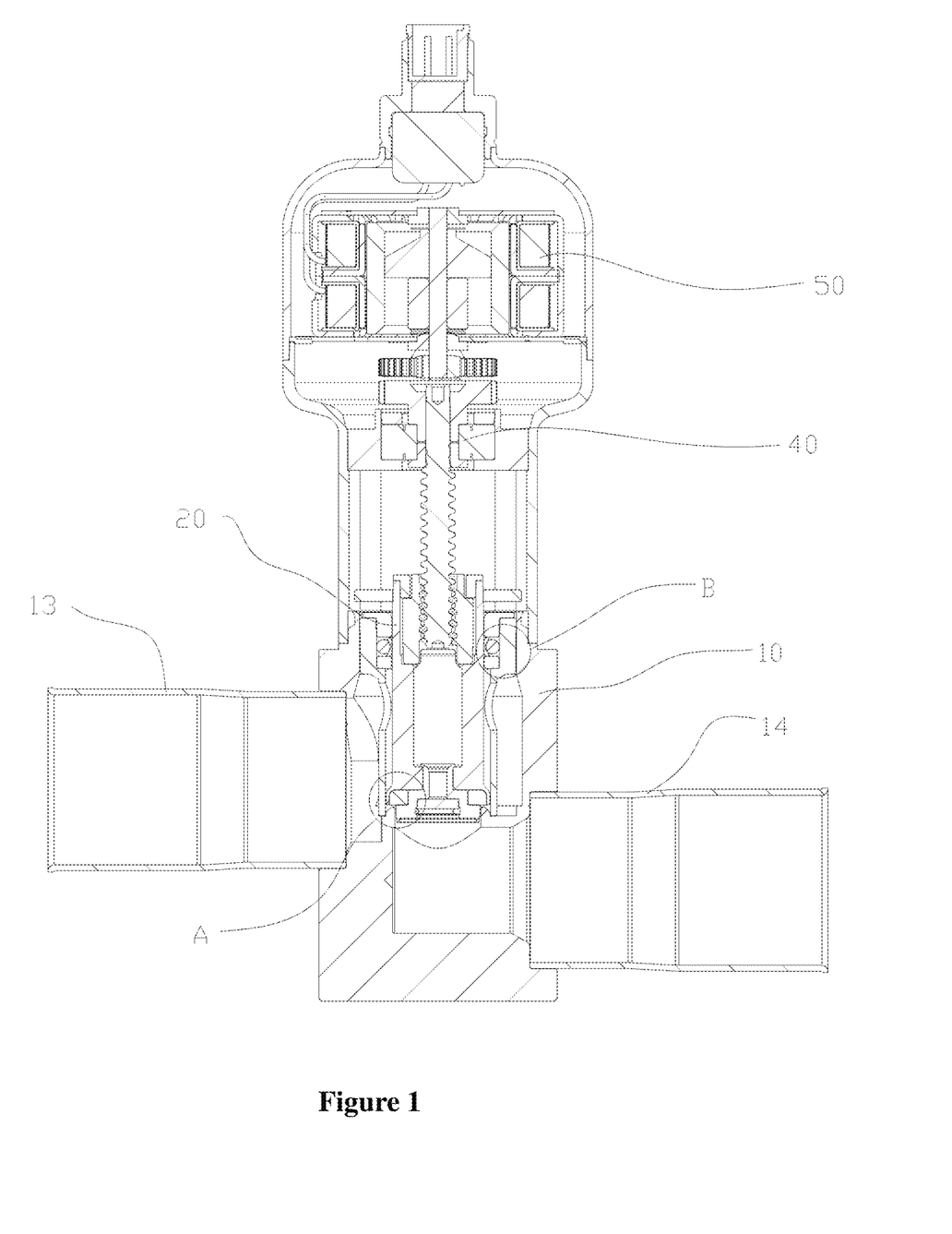
FIG. 1 is a schematic view showing the structure of an electronic expansion valve according to an embodiment of the present application.
Figure 2:
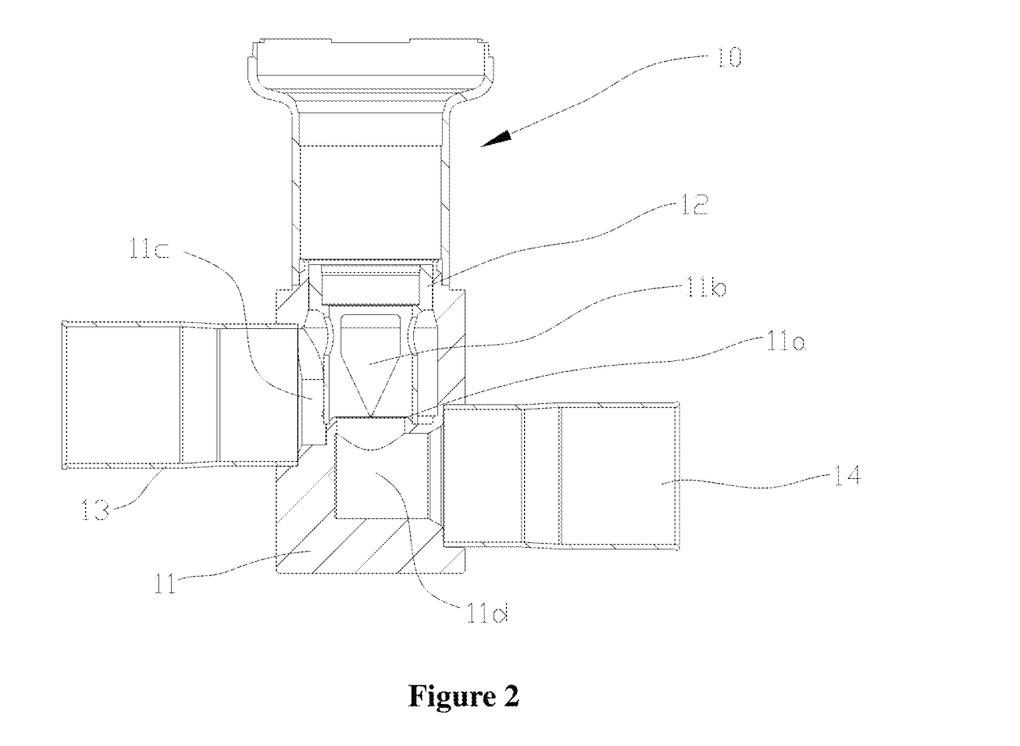
FIG. 2 is a schematic view showing the structure of a valve seat component in FIG. 1.

Reference is made to FIG. 1 and FIG. 2. FIG. 1 is a schematic view showing the structure of an electronic expansion according to an embodiment of the present application, and FIG. 2 is a schematic view showing the structure of a valve seat component in FIG. 1.

The electronic expansion valve includes a valve seat component 10 and a valve stem component 20.

In this embodiment, the valve seat component 10 includes a valve seat 11 and a valve core seat 12. The valve seat 11 is provided with a valve port 11a, a first connection port and a second connection port. A first connection port pipe 13 and a second connection port pipe 14, connected to the first connection port and the second connection port respectively, are shown in FIGS. 1 and 2.

An inner cavity of the valve seat 11 is divided into an upper cavity and a lower cavity 11d by the valve port 11a. The valve core seat 12 is mounted into the upper cavity in a plug-in manner, and divides the upper cavity into a first upper cavity 11b and a second upper cavity 11c surrounding the first upper cavity 11b. Apparently, a core cavity of the valve core seat 12 is just the first upper cavity 11b. A side wall of the valve core seat 12 is provided with a flow opening 12a via which the first upper cavity 11b is in communication with the second upper cavity 11c.

The first connection port is in communication with the second upper cavity 11c, and the second connection port is in communication with the lower cavity 11d.

The valve stem component 20 cooperates with the core cavity of the valve core seat 12, and is axially movable to open or close the valve port 11a, so as to communicate or cut off the first connection port and the second connection port.

The valve stem component 20 has an axial through hole 20a in communication with the valve port 11a and a sealing surface 20b fitting against the valve port 11a to seal the valve port 11a.

It may be understood that structure of the sealing surface 20b is fitted with the structure of the valve port 11a, and the sealing surface 20b may be a planar surface or a bevel as long as it can achieve sealing.

It may be seen from FIG. 2 that, the valve port 11a is always in communication with the second connection port, that is, the second connection port is in communication with the axial through hole 20a of the valve stem component 20, and thus refrigerant in the second connection port pipe 14 is allowed to enter an upper cavity of the valve stem component 20 through the axial through hole 20a of the valve stem component 20. In order to ensure sealing, apparently, an inner wall of the valve core seat 12 is required to be sealed against the valve stem component 20, so as to ensure the upper cavity of the valve stem component 20 not to communicate with the first connection port through a gap between the valve stem component 20 and the side wall of the valve core seat 12, thereby ensuring that the first connection port can be in communication with the second connection port only after the valve port 11a is opened.

Figure 3:
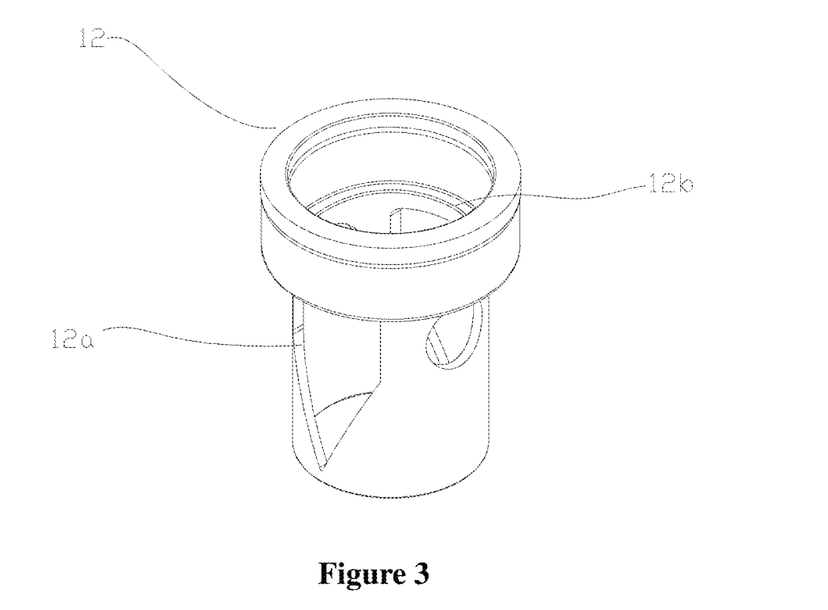
FIG. 3 is a schematic view showing the structure of a valve core seat in FIG. 2.

Reference is made to FIG. 3, which is a schematic view showing the structure of a valve core seat in FIG. 2.

The first connection port is in communication with the flow opening 12a of the valve core seat 12. Specifically, the flow opening 12a has a circumferential dimension tapering downward in an axial direction of the valve core seat 12. As such, when the valve stem component 20 is moved axially away from the valve port 11a, the first connection port may be in communication with the valve port 11a through the flow opening 12a, and as the valve stem component 20 is gradually moved upward, the area of the flow opening 12a available for the refrigerant to flow through is gradually increased, thereby achieving a function that the flow rate of the refrigerant is adjusted by axial movement of the valve stem component 20.

In a specific solution, the flow opening 12a has a V shape. Of course, in practical setting, the shape of the flow opening 12a is not limited to the above shape, and may be designed specifically according to a curve of flow rate required practically and so on.

Figure 4:
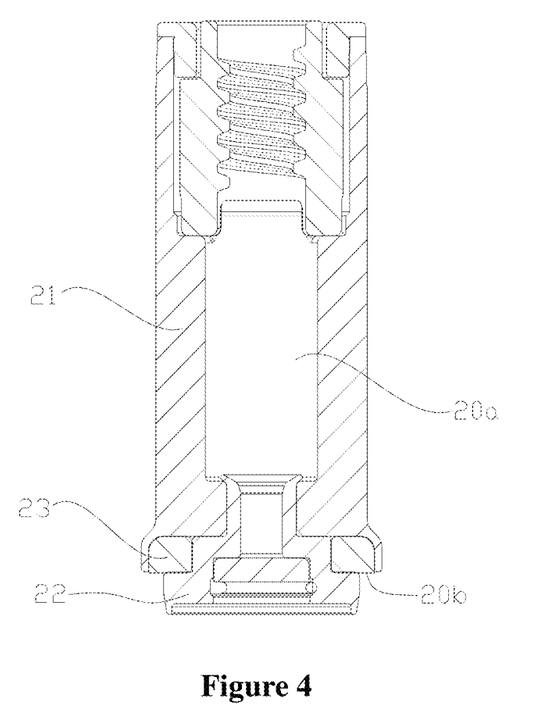
FIG. 4 is a schematic view showing the structure of a valve stem component in FIG. 1.

Reference is made to FIG. 4, which is a schematic view showing the structure of a valve stem component in FIG. 1.

The valve stem component 20 includes a valve stem 21 and a valve core 22 fixed to a lower end of the valve stem 21. The valve stem 21 is a cylindrical body, which includes a small-diameter segment cylinder 211 and a large-diameter segment cylinder 212 close to the valve port 11a. The small-diameter segment cylinder 211 is kept sealed against the valve core seat 12.

In this embodiment, a sealing ring 23 is further press-fitted between the large-diameter segment cylinder 212 and the valve core 22, and a lower end surface of the sealing ring 23 is capable of fitting against an end surface, at the valve port 11a, of the valve seat 11 to seal the valve port. It may be understood that the valve core 22 is inserted into the lower cavity 11d after assembly.

It is to be noted that, in practical use, the sealing ring 23 may not be provided and the lower end surface of the large-diameter segment cylinder 212 forms the sealing surface 20b sealing against the end surface, at the valve port 11a, of the valve seat 11.

Figure 5:
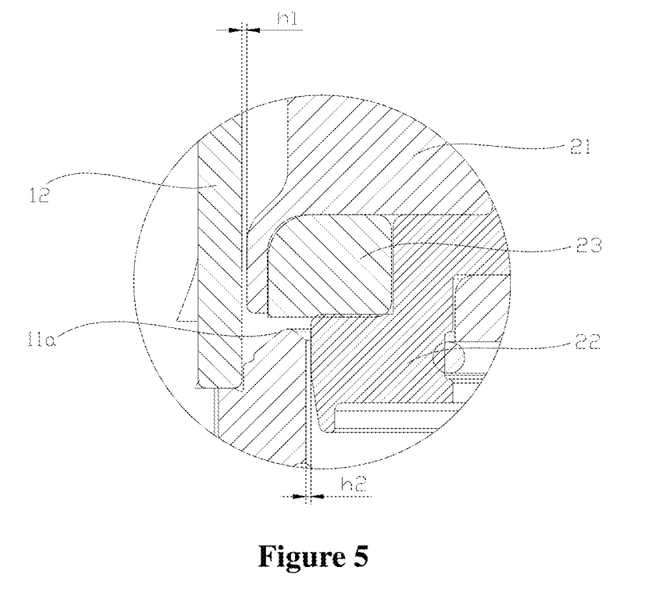
FIG. 5 is a partially enlarged view of a part A in FIG. 1.

Reference is made to FIG. 5 which is a partially enlarged view of a part A in FIG. 1.

A first gap h1 is provided between the large-diameter segment cylinder 212 and the valve core seat 12, so as to form a first throttle passage. A second gap h2 is provided between the valve core 22 and the valve port 11a, so as to form a second throttle passage. As such, when the valve is just opened and the valve port 11a is opened in a small degree, a medium pressure zone having a pressure between a refrigerant inlet pressure (the pressure of a high pressure zone) and a refrigerant outlet pressure (the pressure of a lower pressure zone) may be formed at the valve port 11a due to effects of the first throttle passage and the second throttle passage. Formation of the medium pressure zone may properly equalize an air pressure to which the valve stem component 20 is subjected, thereby improving valve opening capability while ensuring tightness. Apparently, throttling effects of the throttle passages are related to sizes of the first gap h1 and the second gap h2, and the magnitude of the pressure of the formed medium pressure zone is also related to the sizes of the first gap h1 and the second gap h2 correspondingly.

Figure 12:
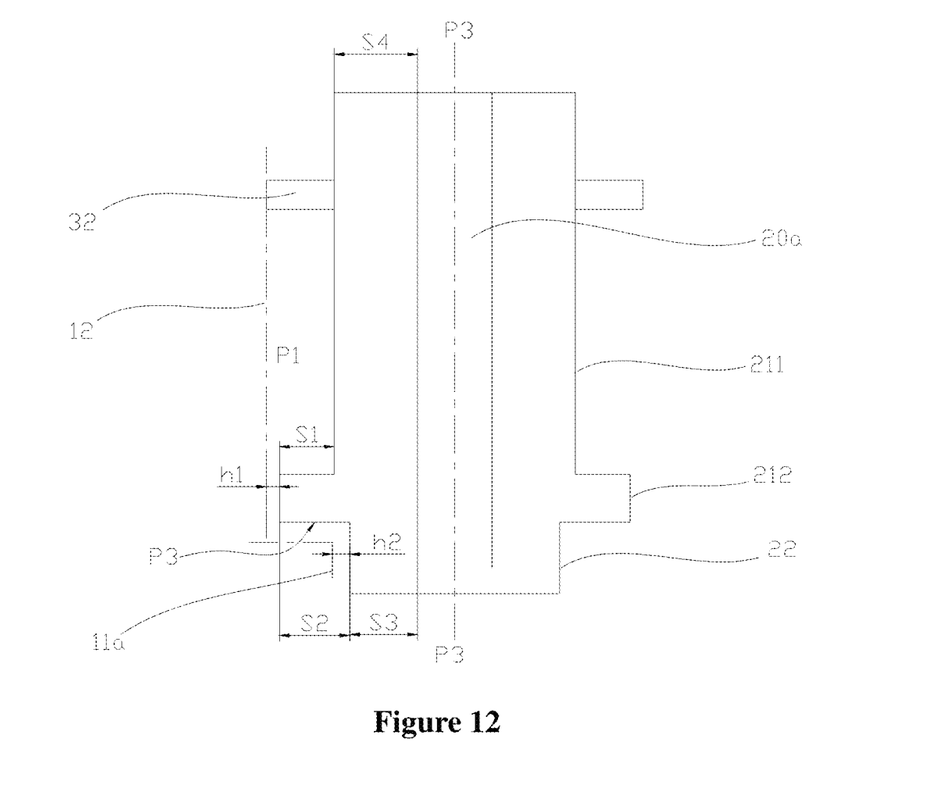
FIG. 12 is a schematic diagram showing forces of a valve stem component in FIG. 1.

Specifically, in this embodiment, forces that are subjected by the valve stem component 20 may be understood with reference to FIG. 12. FIG. 12 is a schematic diagram showing forces being subjected by a valve stem component in FIG. 1. The valve stem component in FIG. 12 is simplified and shown schematically.

As is shown in FIG. 12, a dotted line on a leftmost side indicates an inner wall of the valve core seat 12, and the first gap h1 is provided between the large-diameter segment cylinder 212 of the valve stem component 20 and the valve core seat 12, and the second gap h2 is provided between the valve core 22 and the valve port 11a; refrigerant enters from the first connection port wherein the pressure is P1, and the pressure at the second connection port is P3.

Since the first connection port is in communication with the second upper cavity 11c, the pressure in the second upper cavity 11c is P1. A step surface of the valve stem 21 at a joint of the large-diameter segment cylinder 212 and the small-diameter segment cylinder 211 of the valve stem 21 is subjected to an acting force from the refrigerant at the first connection port, and an effective pressure receiving area is S1. Since the second connection port is in communication with the lower cavity 11d, a pressure in the lower cavity 11d is P3, that is, a bottom of the valve core 22 is subjected to the pressure P3 and an effective pressure receiving area that the bottom portion of the valve core 22 is subjected to an acting force from the refrigerant at the second connection port is S3. In addition, since the valve stem component 20 has the axial through hole 20a, a top end of the valve stem component 20 is also subjected to a pressure P3, and a corresponding effective pressure receiving area is S4. Apparently, the effective pressure receiving area S4 is greater than the effective pressure receiving area S3 at the bottom portion of the valve core 22.

As is described before, when the valve stem component 20 is moved upward axially and the valve port is caused to be opened in a small degree, a medium pressure zone, which has a pressure P2, is formed between the first throttle passage and the second throttle passage. An end surface (that is, the end surface forming the sealing surface for sealing the valve port 11a) of the large-diameter segment cylinder 212, where the large-diameter segment cylinder 212 is in cooperation with the valve core 22, is subjected to an acting force from the medium pressure zone, and a corresponding effective pressure receiving area is S2. Apparently, the effective pressure receiving area S2 is greater than the effective pressure receiving area S1 for receiving a pressure from the refrigerant at the first connection port described above.

As is analyzed above, the valve stem component 20 subjects a force $F=P1S1-P2S2+P3S4-P3S3$.

It may be seen from FIG. 12 that $S1+S4=S2+S3$, and it may be derived from the equation, in combination with the above equation, that:

the valve stem component 20 subjects the force $F=(P1-P3)S1-(P2-P3)S2$, wherein $S1<S2$.

Since $P1>P2>P3$, $P1-P3>P2-P3$. Therefore, by controlling the magnitude of P2, the force F subjected by the valve stem component 20 is allowed to be close to zero, and thus valve opening resistance is reduced and in this case the valve stem component 20 is no more subjected to an axially upward acting force, and the tightness can be further ensured.

Compared with the conventional technology, the electronic expansion valve according to this embodiment is additionally provided with the first throttle passage and the second throttle passage, such that a medium pressure zone is formed at the valve port 11a when the valve port 11a is opened in a small degree. By controlling the pressure of the medium pressure zone, the forces subjected by the valve stem component 20 can be balanced, thereby reducing the valve opening resistance and improving the valve opening capability.

It may be understood that in that case that the refrigerant flows in a reverse direction to the direction described above, force analysis of the valve stem component 20 is similar to the force analysis described above.

The magnitude of the pressure in the medium pressure zone is related to the sizes of the first throttle passage and the second throttle passage.

In a solution, the first gap h1 between the large-diameter segment cylinder 212 and the valve core seat 12 may be in a range of 0.1 mm to 0.5 mm.

In a solution, the second gap h2 between the valve core 22 and the valve port 11a may be in a range of 0.1 mm to 0.8 mm.

In application, the first gap h1 and the second gap h2 can be set depending on practical demands. The first gap h1 and the second gap h2 cannot be too small, so as to avoid occurrence of a jamming phenomenon during valve action. The first gap h1 and the second gap h2 cannot be too large either, so as to avoid failing to function throttling.

In a further solution, the large-diameter segment cylinder 212 has an axial size less than that of the valve core 22.

The pressure P2 of the medium pressure zone is related to lengths of the formed throttling passages in addition to the sizes of the gaps. If the first gap h1 is constant, as the length (i.e., an axial size of the large-diameter segment cylinder 212) of the first throttle passage reduces, a pressure gradient between the pressure P1 of the high pressure zone and the pressure P2 of the medium pressure zone may be smaller, i.e., a pressure difference between P1 and P2 may be smaller, which can further reduce an axial air pressure that impedes valve opening of the valve stem component 20, thereby facilitating improving the valve opening performance.

For each of the embodiments described above, one of the inner wall of the valve core seat 12 and an outer wall of the valve stem component 20 may be provided with a mounting groove in which a sealing washer 32 is provided. The sealing washer 32 allows good tightness between the valve stem component 20 and the valve core seat 12.

It is understood in conjunction with FIGS. 2 to 3 and FIGS. 6 to 8 that in a solution, the core cavity of the valve core seat 12 is in a form of a stepped hole, forming an annular step surface 12b facing a motor 50.

Figure 8:
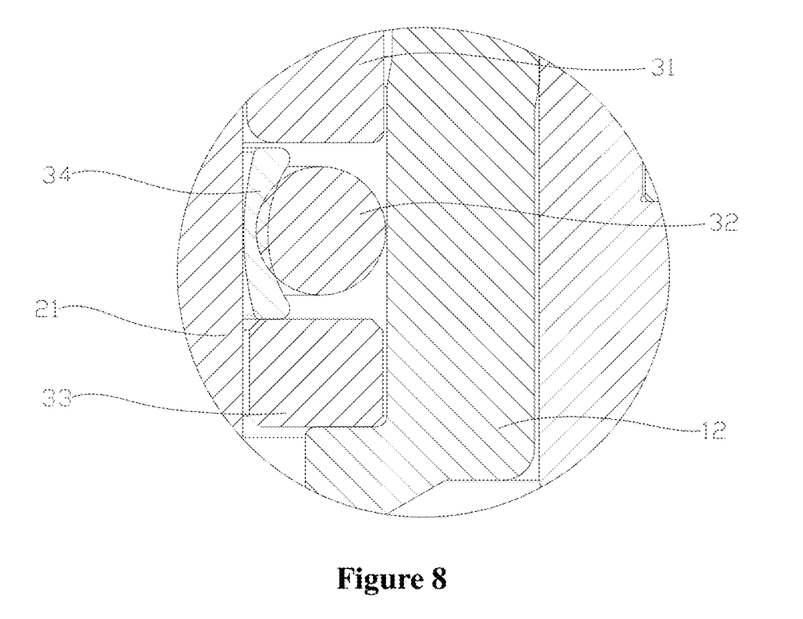
FIG. 8 is a partially enlarged view of a part B in FIG. 1.

The electronic expansion valve also includes a position-limiting sleeve 31 which is inserted into an stepped hole of the valve core seat 12. An upper end portion of the position-limiting sleeve 31 has an annular radial boss which is disposed on an upper end surface of the valve core seat 12, in this case, the inner wall of the valve core seat 12, an end surface, facing the valve port 11a, of the position-limiting sleeve 31 and the annular step surface 12b of the valve core seat 12 form the mounting groove, and the sealing washer 32 may be placed in the mounting groove.

Figure 6:
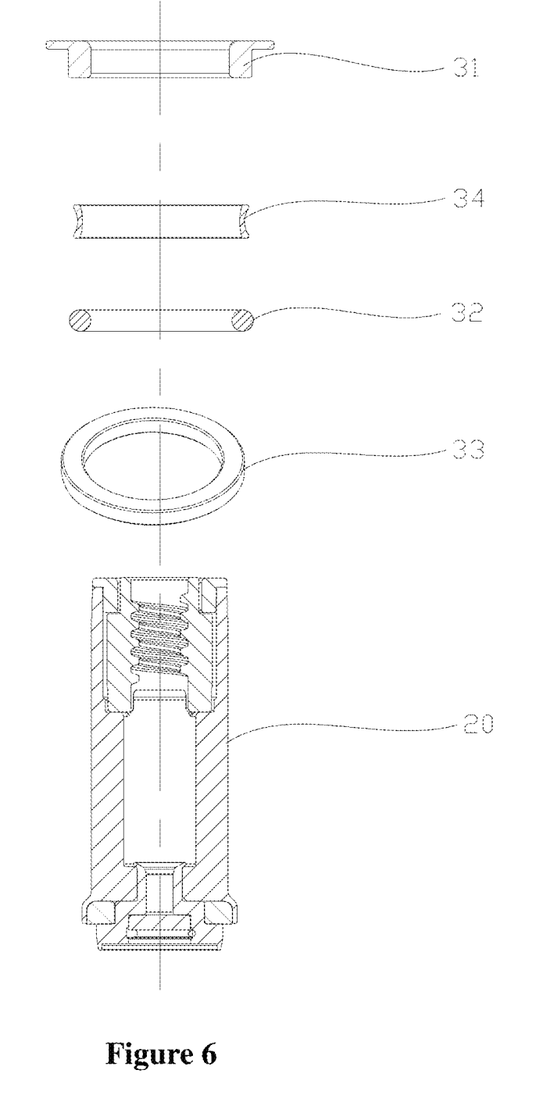
FIG. 6 is a schematic view showing assembly of a valve stem component with a position-limiting sleeve in FIG. 1.
Figure 7:
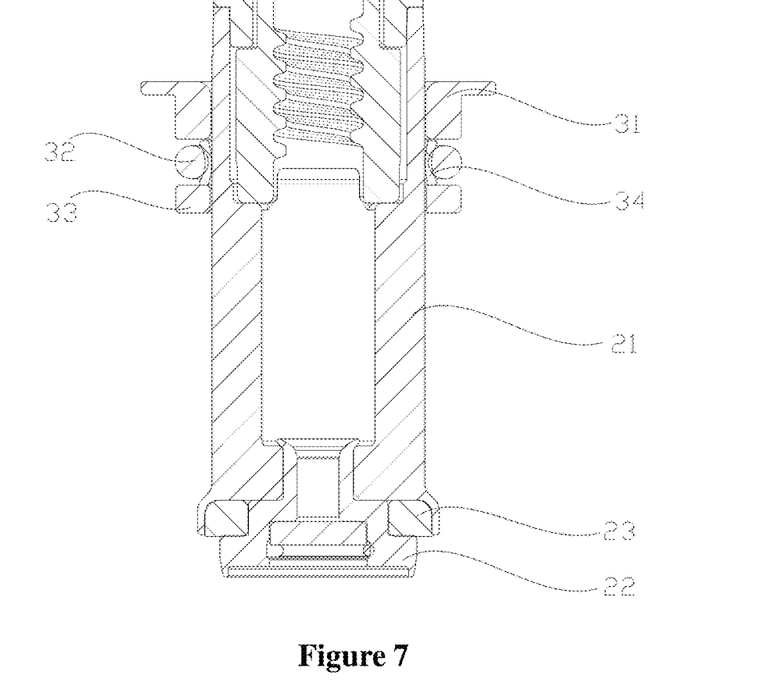
FIG. 7 is a schematic structural view showing the components in FIG. 6 in an assembled state.

Such a construction facilitates mounting the sealing washer 32. The valve stem component 20 may be fitted into the valve core seat 12 first, and the sealing washer 32 and the position-limiting sleeve 31 are successively mounted into the valve core seat 12. Alternatively, as is shown in FIG. 6, after the sealing washer 32 and the position-limiting sleeve 31 are fitted to the valve stem component 20 to form an integral body, the integral body is mounted into the valve core seat 12.

Of course, it is also possible that the mounting groove is provided in the valve stem component 20, however, in view of the strength and design requirements of the valve stem component 20, the mounting groove is preferably provided in the valve core seat 12.

Furthermore, a retaining ring 33 may be further provided between the sealing washer 32 and the annular step surface 12b. The retaining ring 33 is provided such that the sealing washer 32 sliding out of the mounting groove during axial movement of the valve stem component 20 can be prevented.

Furthermore, an annular sliding-assist sheet 34 is further provided in the mounting groove, and the sliding-assist sheet 34 is in contact with the outer wall of the valve stem component 20. The sealing washer 32 is located between the sliding-assist sheet 34 and the inner wall of the valve core seat 12. When there is a differential pressure between the first connection port and the second connection port, the sealing washer 32 is squeezed to deform by a pressure. The sliding-assist sheet 34 is capable of catching a squeezing force of the sealing washer 32 and fitting with the outer wall of the valve stem component 20 tightly, which ensures a valve body will not leak. In addition, the sliding-assist sheet 34 is provided such that frictional resistance in the axial movement of the valve stem component 20 is also reduced greatly.

In the case that the mounting groove is formed by cooperation of the position-limiting sleeve 31 and the valve core seat 12, the assembled position-limiting sleeve 31 and the valve core seat 12 are required to be kept relatively fixed to each other, and may be fixed in a manner such as welding and threaded connection.

Figure 9:
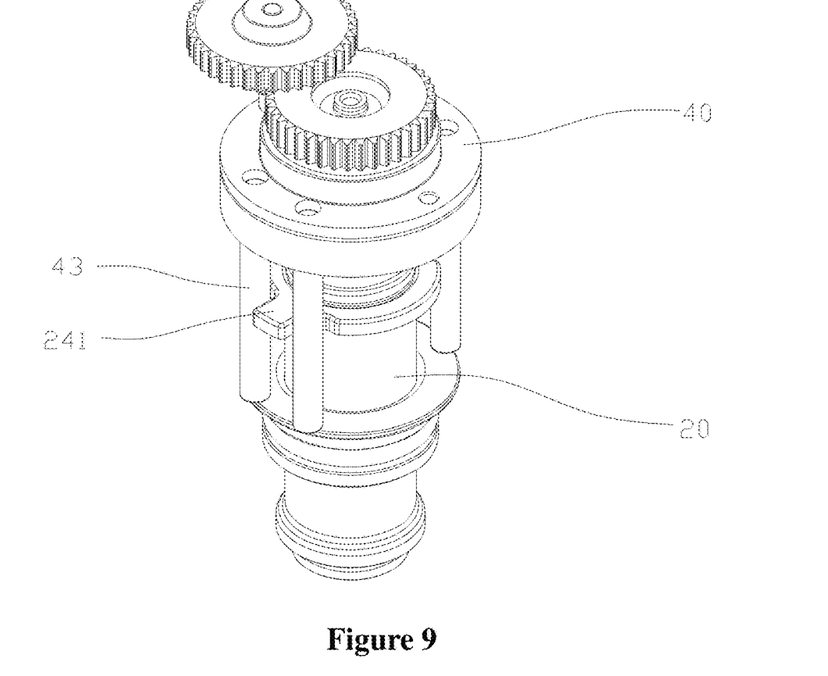
FIG. 9 is a schematic structural view showing cooperation of a gear system with a valve stem component in FIG. 1.
Figure 10:
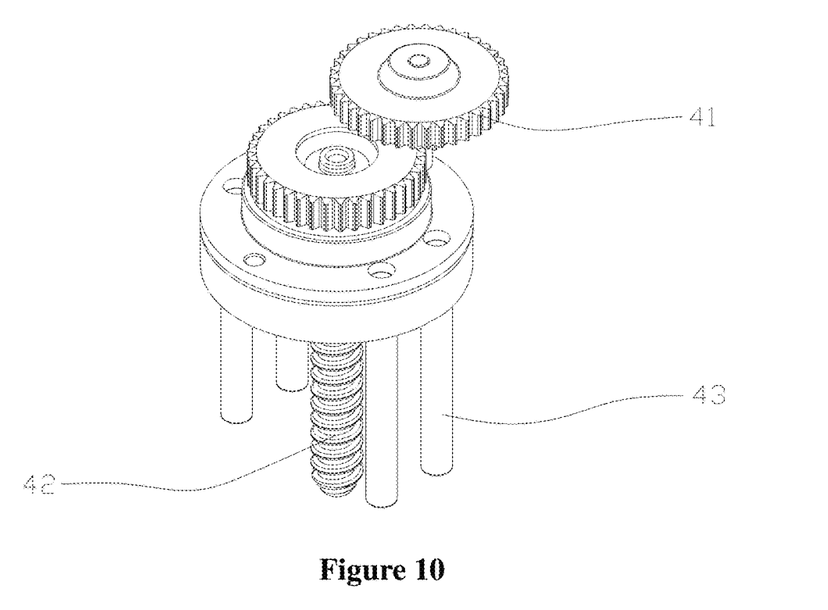
FIG. 10 is a schematic view showing the structure of the gear system in FIG. 9.
Figure 11:
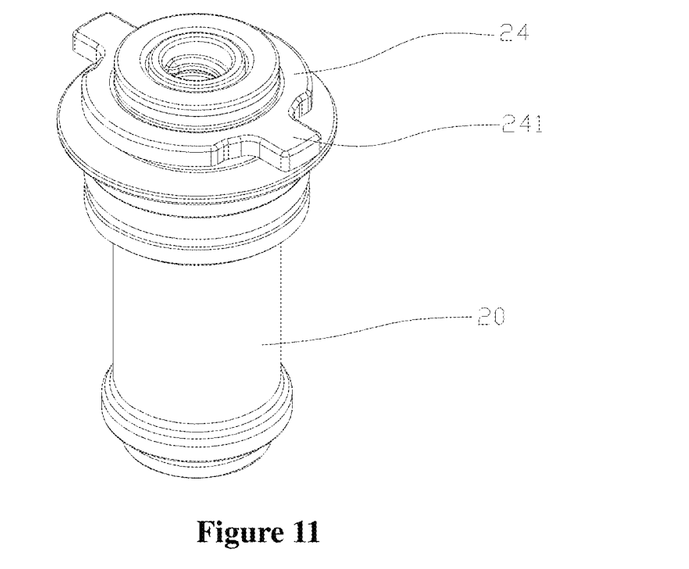
FIG. 11 is a schematic view showing the structure of the valve stem component in FIG. 9.

In this embodiment, a component for driving the valve stem component 20 to move axially is a gear system 40, which is understood in conjunction with FIGS. 9 to 11.

The gear system 40 includes a gear 41 and a screw rod 42. A motor 50 of the electronic expansion valve drives the gear 41 of the gear system 40 to rotate. The screw rod 42 rotates as the gear 41 rotates. The screw rod 42 is threadedly connected with the valve stem component 20. After the valve stem component 20 is positioned circumferentially, rotation of the screw rod 42 may be converted into the axial movement of the valve stem component 20.

In order to circumferentially positioning the valve stem component 20, the gear system 40 further includes multiple position-limiting levers 43 for restricting the valve stem component 20 from rotating circumferentially. An upper end of the valve stem component 20 is provided with a snap 24. A boss 241 of the snap 24 is stuck between two position-limiting levers 43, and since positions of the multiple position-limiting levers 43 are fixed, the snap 24 cannot rotate, thus circumferential rotation of the valve stem component 20 is restricted, which allows the valve stem component 20 to move only in an axial direction.

On the basis of this, the position-limiting levers 43 of the gear system 40 may press the above position-limiting sleeve 31 tightly against the upper end surface of the valve core seat 12 and realize the fixing of the position-limiting sleeve 31 and the valve core seat 12, which is simple and reliable and makes replacement of members such as the position-limiting sleeve 31 and the sealing washer 32 more convenient.

The electronic expansion valve according to the present application is described above in detail. Specific examples are applied herein to set forth principles and embodiments of the present application, and description of the above embodiments is only used to aid in understanding methods and core ideas of the present application. It should be noted that, for the person skilled in the art, various improvements and modifications can be further made to the present application without departing from principles of the present application, and these improvements and modifications also fall within the scope of claims of the present application.

The invention claimed is:
1. An electronic expansion valve, comprising:
   a valve seat component comprising a valve seat and a valve core seat inserted into the valve seat;
   a valve stem component which is axially movable along a core cavity of the valve core seat to open or close a valve port for communicating or cutting off two connection ports of the electronic expansion valve;

the valve stem component has an axial through hole in communication with the valve port and a sealing surface which is configured to fit against the valve port to seal the valve port; and wherein the valve stem component comprises a valve stem and a valve core fixed to a lower end of the valve stem, and the valve stem is a cylindrical body and comprises a small-diameter segment cylinder and a large-diameter segment cylinder close to the valve port, and in a case that the valve stem closes the valve port, a first gap along a radial direction of the core cavity of the valve core seat is provided between the large-diameter segment cylinder and the valve core seat, and a second gap along the radial direction of the core cavity of the valve core seat is provided between the valve core and the valve port.

2. The electronic expansion valve according to claim 1, wherein each of the size of the first gap and the size of the second gap is in a preset range, which allows a pressure zone having a pressure between a refrigerant inlet pressure and a refrigerant outlet pressure to be formed at the valve port between the first gap and the second gap at the start of valve opening.

3. The electronic expansion valve according to claim 2, wherein the first gap has a size ranging from 0.1 mm to 0.5 mm.

4. The electronic expansion valve according to claim 3, wherein the two connection ports and the valve port are all provided in the valve seat, and an inner cavity of the valve seat is divided into an upper cavity and a lower cavity by the valve port;

the valve core seat is inserted into the upper cavity and divides the upper cavity into a first upper cavity and a second upper cavity surrounding the first upper cavity, and a side wall of the valve core seat is provided with a flow opening via which the first upper cavity is in communication with the second upper cavity; and the second upper cavity and the lower cavity are in communication with the two connection ports respectively.

5. The electronic expansion valve according to claim 3, wherein the valve stem component further comprises a sealing ring, and the sealing ring is press-fitted between the valve stem and the valve core, and a lower end surface of the sealing ring forms the sealing surface.

6. The electronic expansion valve according to claim 2, wherein the second gap has a size ranging from 0.1 mm to 0.8 mm.

7. The electronic expansion valve according to claim 6, wherein the two connection ports and the valve port are all provided in the valve seat, and an inner cavity of the valve seat is divided into an upper cavity and a lower cavity by the valve port;

the valve core seat is inserted into the upper cavity and divides the upper cavity into a first upper cavity and a second upper cavity surrounding the first upper cavity, and a side wall of the valve core seat is provided with a flow opening via which the first upper cavity is in communication with the second upper cavity; and the second upper cavity and the lower cavity are in communication with the two connection ports respectively.

8. The electronic expansion valve according to claim 6, wherein the valve stem component further comprises a sealing ring, and the sealing ring is press-fitted between the valve stem and the valve core, and a lower end surface of the sealing ring forms the sealing surface.

9. The electronic expansion valve according to claim 2, wherein the two connection ports and the valve port are all provided in the valve seat, and an inner cavity of the valve seat is divided into an upper cavity and a lower cavity by the valve port;

the valve core seat is inserted into the upper cavity and divides the upper cavity into a first upper cavity and a second upper cavity surrounding the first upper cavity, and a side wall of the valve core seat is provided with a flow opening via which the first upper cavity is in communication with the second upper cavity; and the second upper cavity and the lower cavity are in communication with the two connection ports respectively.

10. The electronic expansion valve according to claim 2, wherein the valve stem component further comprises a sealing ring, and the sealing ring is press-fitted between the valve stem and the valve core, and a lower end surface of the sealing ring forms the sealing surface.

11. The electronic expansion valve according to claim 1, wherein the large-diameter segment cylinder has an axial dimension less than the axial dimension of the valve core.

12. The electronic expansion valve according to claim 11, wherein the two connection ports and the valve port are all provided in the valve seat, and an inner cavity of the valve seat is divided into an upper cavity and a lower cavity by the valve port;

the valve core seat is inserted into the upper cavity and divides the upper cavity into a first upper cavity and a second upper cavity surrounding the first upper cavity, and a side wall of the valve core seat is provided with a flow opening via which the first upper cavity is in communication with the second upper cavity; and the second upper cavity and the lower cavity are in communication with the two connection ports respectively.

13. The electronic expansion valve according to claim 11, wherein the valve stem component further comprises a sealing ring, and the sealing ring is press-fitted between the valve stem and the valve core, and a lower end surface of the sealing ring forms the sealing surface.

14. The electronic expansion valve according to claim 1, wherein the two connection ports and the valve port are all provided in the valve seat, and an inner cavity of the valve seat is divided into an upper cavity and a lower cavity by the valve port;

the valve core seat is inserted into the upper cavity and divides the upper cavity into a first upper cavity and a second upper cavity surrounding the first upper cavity, and a side wall of the valve core seat is provided with a flow opening via which the first upper cavity is in communication with the second upper cavity; and the second upper cavity and the lower cavity are in communication with the two connection ports respectively.

15. The electronic expansion valve according to claim 14, wherein the flow opening has a circumferential dimension tapering downward in an axial direction of the valve core seat.

16. The electronic expansion valve according to claim 15, wherein a lower portion of the flow opening is in a V-shape.

17. The electronic expansion valve according to claim 1, wherein the valve stem component further comprises a sealing ring, and the sealing ring is press-fitted between the valve stem and the valve core, and a lower end surface of the sealing ring-forms the sealing surface.

* * * * *